US007458771B2

(12) United States Patent
Abadie et al.

(10) Patent No.: US 7,458,771 B2
(45) Date of Patent: Dec. 2, 2008

(54) RETAINING OF CENTERING KEYS FOR RINGS UNDER VARIABLE ANGLE STATOR VANES IN A GAS TURBINE ENGINE

(75) Inventors: Aude Abadie, Melun (FR); Alain Piot, Evry (FR); Alain Marc Lucien Bromann, Vulaines/Seine (FR)

(73) Assignee: SNECMA, Paris (FR)

( * ) Notice: Subject to any disclaimer, the term of this patent is extended or adjusted under 35 U.S.C. 154(b) by 515 days.

(21) Appl. No.: 11/221,747

(22) Filed: Sep. 9, 2005

(65) Prior Publication Data

US 2006/0056963 A1 Mar. 16, 2006

(30) Foreign Application Priority Data

Sep. 10, 2004 (FR) .................................. 04 52020

(51) Int. Cl.
*F01D 5/03* (2006.01)
*F01D 11/00* (2006.01)
*F01D 9/00* (2006.01)
*F02C 7/28* (2006.01)

(52) U.S. Cl. .................................... 415/160; 415/170.1

(58) Field of Classification Search ................... 415/29, 415/155, 159, 160, 162, 170.1

See application file for complete search history.

(56) References Cited

U.S. PATENT DOCUMENTS 2,613,029 A * 10/1952 Wilde .......................... 415/37
3,070,352 A * 12/1962 Welsh ......................... 416/191
3,303,992 A * 2/1967 Johnson ................... 415/149.4
3,360,241 A * 12/1967 Lindquist .................... 415/160
3,411,794 A * 11/1968 Allen ......................... 277/414
3,887,297 A * 6/1975 Welchek ..................... 415/161
4,514,141 A * 4/1985 Marey ........................ 415/160
4,604,030 A * 8/1986 Naudet ....................... 415/126
4,668,167 A 5/1987 Le Maout et al.
4,792,277 A * 12/1988 Dittberner et al. ........... 415/160
4,815,933 A 3/1989 Hansel et al.
4,834,613 A * 5/1989 Hansen et al. .............. 415/160
5,141,394 A * 8/1992 Donlan ....................... 415/190
5,636,968 A * 6/1997 Audet et al. ................ 415/160
6,095,750 A 8/2000 Ross et al.
6,129,512 A * 10/2000 Agram et al. ............... 415/160
7,125,222 B2 * 10/2006 Cormier et al. ............. 415/160

FOREIGN PATENT DOCUMENTS

EP 0 513 956 A1 11/1992
EP 1 369 552 A2 12/2003

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A gas turbine engine includes at least one compressor stage with an inner ring under variable angle stator vanes including axial keys for centering the inner ring with respect to the stator vanes, and including at least one sealing member support mounted on the inner ring. The keys include a transverse groove cooperating with a radial rib arranged transverse to the engine axis on the periphery of the support for the sealing member.

18 Claims, 3 Drawing Sheets

RETAINING OF CENTERING KEYS FOR RINGS UNDER VARIABLE ANGLE STATOR VANES IN A GAS TURBINE ENGINE

FIELD OF THE INVENTION

The present invention relates to the area of gas turbines, such as gas turbine engines. It pertains in particular to a means of securing a support for a sealing member to a fixed blade assembly.

BACKGROUND OF THE INVENTION

A gas turbine engine comprises a compressor with one or several stages supplying a combustion chamber producing hot gases which drive one or more turbine rotors. The latter are connected to and drive the compressor rotors.

In particular, a compressor consists of several stages, each comprising a disc of rotating blades and stator vanes forming guide vanes. The rotating blades accelerate the airflow tangentially and compress it, whilst the guide vanes guide the airflow produced by the rotor blades so that the airflow leaving the stator vanes lies within the engine axis. In the high pressure section, the upstream stages of the guide vanes are generally variably angled. They are pivot-mounted so that they may be set at an angle with respect to the engine axis. A guide vane stage, within the scope of the present invention, consists more precisely of a plurality of independent stator vanes attached at one end to the compressor casing and extended at the other end by a lower pivot. The pivots are connected together by an inner ring which delimits the inner wall of the gas flow.

The inner ring may be circumferential in a single piece or preferably consisting of a plurality of sectors, at least two in semi-circles. The inner stator ring carries sealing members cooperating with mating sealing members on the rotor which oppose gas back-flow towards upstream. A prior art assembly can be seen in FIGS. 1 and 2. A stator vane pivot 2 is retained by a dowel 3 in a housing of the ring or ring sector 4. The stator vane is not shown in full. It extends radially outwardly through the gas stream and is fixed to the outer casing.

Ring 2 is held integral with vanes 2 by means of a determined number of keys 5 arranged around the inner stator ring. The keys are arranged either side of the pivot 21 of a vane as can be seen FIG. 2, across the dowel 3. Dowel 3 is crimped onto the vane so as to block any movement separating one from the other. Pivots 21 with their pad are freely rotatable and limited axially by the clearance between the keys and the keyway grooves in the pads with respect to the inner ring. The keys, distributed along the ring, together ensure the centering of the inner ring with respect to the stator vanes. The vanes themselves are retained at their other end, not shown, by the engine structure.

In this prior art example, the inner ring 2 carries a support for a sealing member 6. This sealing member, such as a honeycombed wear-resistant material, cooperates with a mating member on the rotor. Here it comprises a cylindrical part 61 which, towards upstream with respect to the direction of the gas flow, has an angle bracket 62 whose axial portion is housed in a circumferential groove with axial opening made in the upstream surface of ring 2. The cylindrical part bears against the radial inner side of ring 2. The cylindrical element 62 is locked in axial direction by a radial rib 62'. This bears upon the wall of ring 2 which faces downstream. A webbing 63 of substantially frustum shape dips downstream towards the rotor shaft. It comprises an annular housing 65 for the sealing member which is not illustrated. A vertical cowling 66 joins housing 65 upstream to a groove with axial opening facing downstream and provided in ring 2.

To prevent their self rotation leading to corrosion problems through ring friction, the keys comprise an axial shimming head 51. These heads comprise a flat part 53 in which the upper edge of element 62' is housed. Immobilisation in axial direction, as shown, is therefore achieved with the radial rib 62'. One assembly mode comprises the following successive phases. The stator vanes are placed in position. They are held in position by their upper end. The inner ring or inner ring sectors are placed in position by engaging the pivots in housings 42. Ring 2 is immobilised using the keys which also ensure its centering. In an inner ring sector prepared for this purpose, the ring sectors carrying the sealing member support are inserted and caused to slide one after the other inside groove 22 until they are brought to their final position. With this arrangement the assembly is locked in position.

This structure has the disadvantage that it may deform under the action of axial aerodynamic forces exerted by the upstream gases. Instability phenomena therefore occur which are difficult to control.

In addition, as part of the constant desire to improve engine performance in aeronautics, it is sought to reduce the weight of component parts as much as possible.

SUMMARY OF THE INVENTION

The invention manages to attain these objectives. According to the invention, the gas turbine engine comprising at least one compressor stage with an inner ring under variable angle stator vanes provided with axial centering keys for said inner ring with respect to said stator vanes, and comprising at least one sealing member support mounted on the inner ring is characterized by the fact that the said keys comprise a transverse groove cooperating with a radial rib arranged transverse to the engine axis on the peripheral surface of the sealing member support.

With this solution it is possible in particular to substantially reduce the weight of the sealing assembly.

Preferably the rib also cooperates with a radial groove provided in the ring perpendicular to the engine axis. More precisely said groove forms an intersection with the housing of the keys in the ring. According to one particular embodiment, the rib is made integral with a cylindrical portion of said support.

To ensure stable mounting, the sealing member support also comprises tongue and groove connection means with the inner ring.

These connection means permit different assemblies:

The tongue is axial and arranged on the support, and the groove has an axial opening and is arranged on the inner ring.

The tongue is axial and arranged on the inner ring, and the groove has an axial opening and is arranged on the support, the sealing member being offset towards downstream overhanging the ring.

The tongue is axial and arranged on the support, and the groove with axial opening is arranged on the ring, the sealing member being offset downstream overhanging the ring.

The groove with radial opening and the connection means are arranged either side of the pivots of the stator vanes.

The groove with radial opening and the connection means are arranged on one same side with respect to the pivots.

BRIEF DESCRIPTION OF THE DRAWINGS

The invention will now be described in more detail according to different embodiments with reference to the appended drawings in which.

DETAILED DESCRIPTION OF THE PREFERRED EMBODIMENTS

Figure 4:
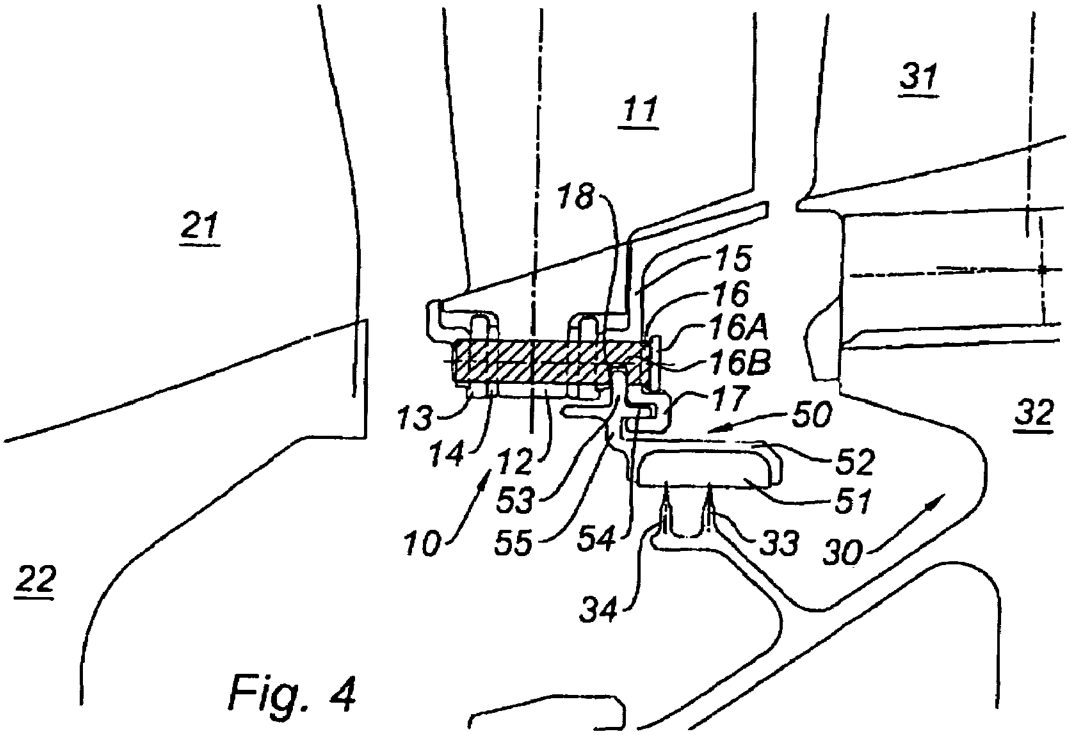
FIG. 4 shows a mounting arrangement according to the invention of the sealing member support in FIG. 3.

According to the embodiment FIG. 4, part of a gas turbine is shown in cross-section in a plane passing through the engine axis. Here it is a compressor. A stage formed of guide vanes or fixed stator vanes 10 is arranged between two mobile stages 20 and 30 of blades 21, 31 respectively mounted on the periphery of a rotor disc 22, 32.

The gas flow guide stage 10 consists of stator vanes 11 mounted on an outer casing ring not visible in the figure. These vanes 11 are fixed but their angle setting is adjustable in relation to different engine speeds. Vanes 11 are extended at their inner end by a pivot 12 and are each housed in a bushing 13. The latter is fixed in a radial housing provided in an inner ring 15. The vane is able to pivot about the pivot pin by means of a pad 14 inserted between the pivot 12 and fixed bushing 13. Ring 15 extends over the entire circumference insofar as the guide vane assembly is annular. Although it may consist of one piece it generally consists of at least two sectors. The ring is held in position with respect to vanes 11 by keys 16 as in the prior art solution. The keys are arranged in pairs either side of a pivot each in a housing which passes through the ring axially and the bushing 13. These keys 16 ensure centering of the ring with respect to the vanes. It is not necessary to provide these on all the blades. These keys have a cylindrical barrel which inserts into an axial housing of ring 15. The key here has a head 16A but it may not have a head.

Clearances provided between the rotor and stator stages allow friction-free rotation. To prevent the fluid compressed by the vanes 11 from circulating toward upstream, sealing means are arranged between the stator and the rotor. According to the illustrated embodiment, the sealing means are of labyrinth type. Annular plates forming fins, here two 33 and 34 are joined to the rotor and their free edge is at a predetermined distance from a sealing member 51 with which they cooperate to limit fluid leaks through these spaces in steady state operation. The sealing member is "abradable" in the sense that it deforms or wears when either one of the plates comes into contact with it. The sealing means are known as such.

The sealing member 51 is fixed in a support 50 which itself is mounted on ring 15. The support comprises an annular element 52 on which the sealing member 51 is fixed. Element 52 is mounted on ring 15 with overhang. It is retained by connection means of tongue and groove type. According to the embodiment FIG. 4, the tongue is joined to element 50. It is of annular shape parallel to element 52 and fixed to the latter by a vertical branch 55 along the upstream edge. The tongue 54 cooperates with a groove 17, made integral with ring 15 in its downstream part, whose opening is oriented axially upstream. A rib 53 that is radial and also made integral with element 50 is housed in a groove 18 with a radial opening arranged in ring 15. Rib 53 in this embodiment lies substantially in the continuation of the vertical branch 55. Groove 18 extends crosswise through the key housing. The rib 53 cooperates with a transverse slot 16B arranged in key 16.

Element 50, with this mounting assembly, is overhanging: the sealing member 51 is offset downstream with respect to the ring.

Figure 5:
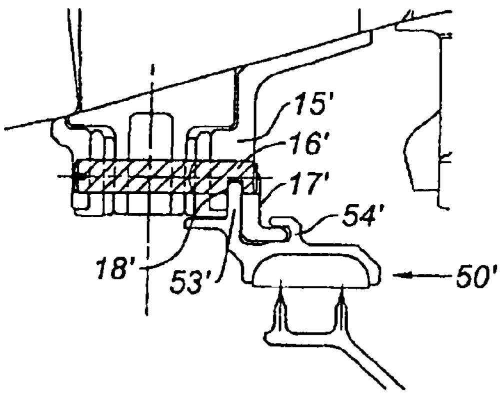
FIG. 5 shows a mounting arrangement of the invention according to a variant of FIG. 4.

In FIG. 5, a variant of the preceding solution is shown concerning the tongue and groove connection means between the sealing member support element 50' and the inner stator ring 15'. The connection means consist of an annular axial tongue 17' arranged on the ring in its downstream part. Groove 54' is arranged on the annular part 52' of element 50'. Its opening faces upstream. The radial rib 53' cooperating with a groove 18' arranged in the ring and forming an intersection with key housings 16' is arranged along the upstream edge of the annular portion 52'. The keys comprise a slot 16'B.

If desired, this arrangement makes it possible, as shown in this figure, to use a key 16' with no head portion.

Figure 1:
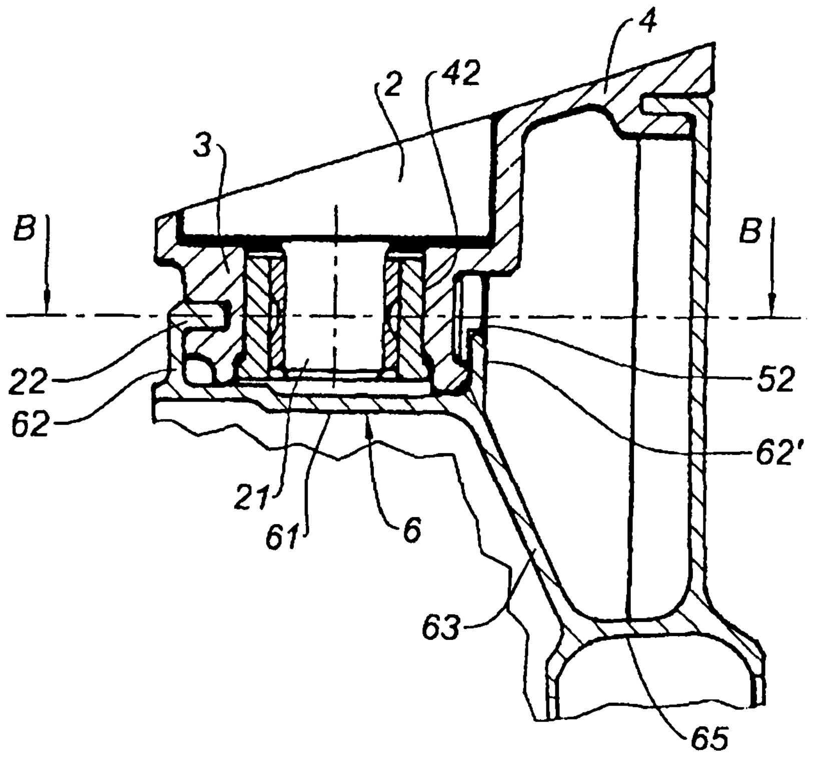
Fig. 1 PRIOR ART
FIG. 1 is a partial cross-sectional view along a plane passing through the engine axis, of a prior art guide vane stage.
Figure 2:
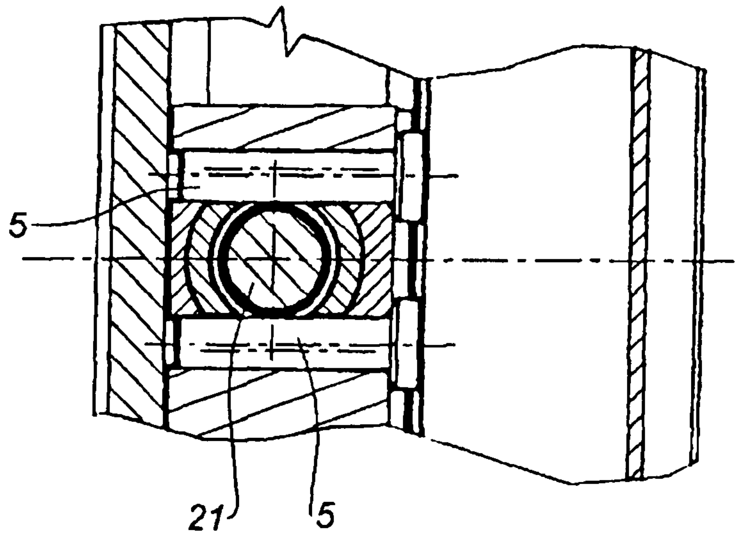
Fig. 2 PRIOR ART
FIG. 2 shows the guide vane stage of FIG. 1 along a sectional plane BB perpendicular to the blocking pivot of the stator vane.
Figure 3:
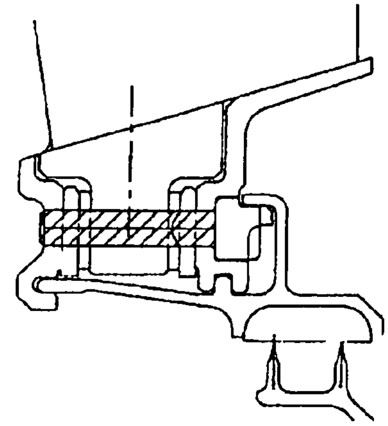
Fig. 3 PRIOR ART
FIG. 3 is a partial cross-sectional view along a plane passing through the engine axis of a second guide vane stage of the prior art.

With respect to an overhanging assembly of the prior art shown FIG. 3, it can be seen that the quantity of material is reduced. The immobilisation of the key is ensured by a simple radial rib unlike the prior art solution with angle bracket. The connection means are also more compact. It can also be seen that the assembly of the invention prevents any risk of detachment arising from pressure exerted in axial direction whereas the solution shown FIG. 3 carries the risk that the branches forming the clamp holding the support onto the ring may move apart.

Figure 7:
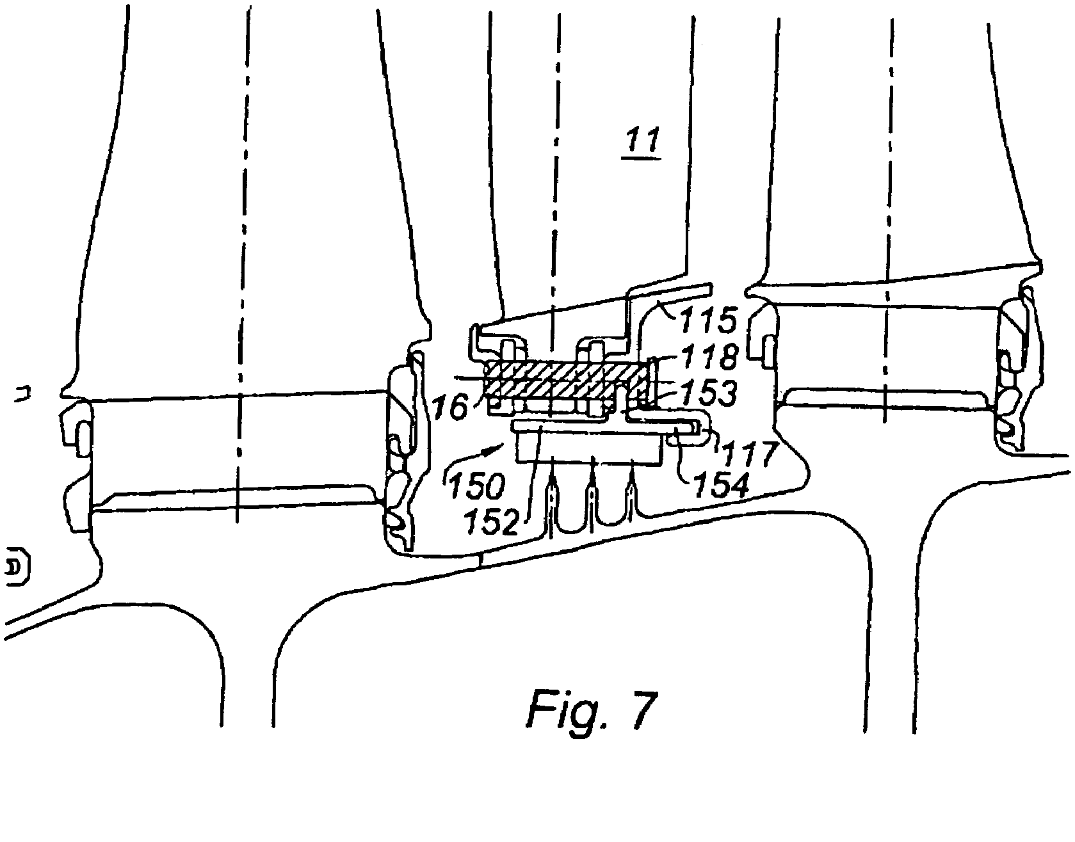
FIG. 7 shows a mounting arrangement according to the invention of the sealing member support in FIG. 6.

According to the embodiment of the invention shown FIG. 7, element 150 supporting a sealing member 151 is mounted under the inner ring 115. The cylindrical element 152 of support 150 comprises a radial rib 153 perpendicular to the engine axis and cooperating with a groove 118 arranged in ring 115 whose opening is radial. This rib 153 is also engaged in a slot 16B of key 16 which may be identical to the keys in the preceding embodiments.

The connection means between support element 150 and the inner stator ring 115 consist of a downstream groove 117 arranged in ring 115. The opening of groove 117 is axial and faces downstream. It cooperates with a tongue 154 formed by a downstream extension of the cylindrical element 152 on which the sealing member is fixed.

Figure 8:
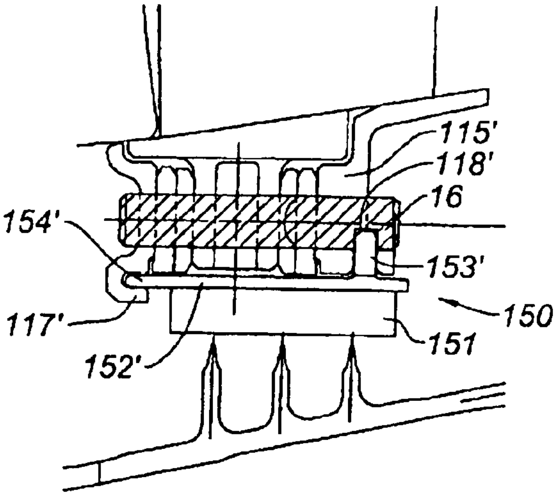
FIG. 8 shows a mounting arrangement of the invention according to a variant of FIG. 7.

FIG. 8 shows a variant of the assembly embodiment under the inner ring. In this example the groove 117' is arranged on ring 115' on the upstream side, its opening is axial and faces downstream. The tongue 154' is formed by an axial extension towards upstream of the cylindrical element 152'. It can be seen that the radial rib 153' is joined to the cylindrical portion 152' close to the downstream edge of the support element 150'. The rib 153' cooperates with a groove 118' arranged in the inner ring 115' and passing through the housing of keys 16 provided with slot 16B.

Figure 6:
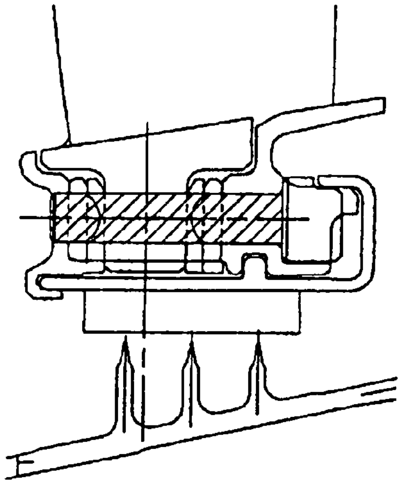
Fig. 6 PRIOR ART
FIG. 6 is a partial cross-sectional view along a plane passing through the engine axis of a third guide vane stage of the prior art.

The two embodiments shown FIGS. 7 and 8 are to be compared with the prior art assembly under the inner ring such as shown in FIG. 6. The quantity of material used is reduced while ensuring efficient shimming and simplified mounting.

The invention claimed is:

1. A gas turbine engine comprising at least one compressor stage with an inner ring under variable angle stator vanes comprising axial keys for centering said inner ring with respect to said stator vanes, and comprising at least one sealing member support that supports a sealing member and that is mounted on the inner ring, wherein said keys comprise a transverse groove cooperating with a radial rib housed in said groove and arranged perpendicular to a longitudinal axis of said engine on the periphery of the sealing member support.

2. A gas engine as in claim 1, wherein said radial rib further cooperates with a groove having a radial opening arranged in the inner ring perpendicular to the longitudinal axis of said engine.

3. A gas engine as in claim 2, wherein said groove in said inner ring with said radial opening forms an intersection with the housing for keys in the inner ring.

4. A gas engine as in claim 1, wherein said radial rib is integerally joined to a portion of said sealin member support.

5. A gas engine as in claim 1, further comprising a suuport connection that connects the sealing member support to the inner ring, said support connection including a tongue and a groove.

6. A gas engine as in claim 5, wherein said tongue of said support connection is axial and arranged on the sealing member support and said groove of said support connenction has an axial opening and is arranged on the inner ring.

7. A gas engine as in claim 5, wherein said tongue of said support connection is axial and arranged on the sealing member support, and said groove of said support connection has an axial opening and is arranged on the inner ring, the sealing member being offset overhanging the inner ring.

8. A gas engine as in claim 5, wherein said tongue of said support connection is axial and arranged on the inner ring and the groove of said support connection has an axial opening and is arranged on the sealing member support, the sealing member being offset overhanging the ring.

9. A gas engine as in claims 5, wherein said groove with said radial opening and the support connection are arranged on either side of pivots of the stator vanes one upstream and another downstream, the sealing member being arranged underneath the inner ring.

10. A gas engine as in claims 5, wherein said groove with said radial opening and said support connection means are arranged on one same side with respect to the pivotsof the stator vanes, the sealing member lying underneath the inner ring.

11. A gas engine as in claim 1, further comprising two rotor stages, each rotor stage comprising a plurality of rotor blades, wherein said inner ring is part of a stator stage and is arranged between said two rotor stages, and wherein said sealing member cooperates with rotor elements joined to one of said rotor stages so as to limit fluid leaks between said stator stage and said rotor stage during steady state operation of said engine.

12. A gas engine as in claim 11, wherein said sealing member includes an abradable material that wears when said rotor elements contact said abradable material of the sealing member during said steady state operation of said engine.

13. A gas engine as in claim 1, wherein each of said stator vanes is pivotable about a pivot axis, each pivot axis being in a radial plane and said radial rib being parallel to said radial plane.

14. A gas engine as in claim 1, wherein said radial rib extends radially outward away from said support and toward said stator vanes.

15. A gas engine as in claim 14, wherein said keys are distributed around said inner ring.

16. A gas engine as in claim 1, wherein said sealing member cooperates with mating sealing members on a rotor of said engine so as to oppose gas back-flow towards upstream of said engine.

17. A gas engine as in claim 1, wherein said radial rib is arranged on the periphery of the sealing member support such that said radial rib is upstream of said sealing member and upstream of a downstream end of said keys.

18. A gas engine as in claim 17, wherein each of said stator vanes is pivotable about a pivot axis, and said radial rib is downstream of each pivot axis.

* * * * *

UNITED STATES PATENT AND TRADEMARK OFFICE

CERTIFICATE OF CORRECTION

PATENT NO. : 7,458,771 B2
APPLICATION NO. : 11/221747
DATED : December 2, 2008
INVENTOR(S) : Aude Abadie et al.

It is certified that error appears in the above-identified patent and that said Letters Patent is hereby corrected as shown below:

Column 5, line 22, change, “sealin” to --sealing--;

line 23, change, “suuport” to --support--.

Signed and Sealed this

Seventeenth Day of March, 2009

JOHN DOLL
*Acting Director of the United States Patent and Trademark Office*